United States Patent [19]
Reininger et al.

[11] Patent Number: 5,317,701
[45] Date of Patent: May 31, 1994

[54] METHOD FOR REFILLING INSTRUCTION QUEUE BY READING PREDETERMINED NUMBER OF INSTRUCTION WORDS COMPRISING ONE OR MORE INSTRUCTIONS AND DETERMINING THE ACTUAL NUMBER OF INSTRUCTION WORDS USED

[75] Inventors: Russell Reininger; William B. Ledbetter, Jr., both of Austin, Tex.

[73] Assignee: Motorola, Inc., Schaumburg, Ill.

[21] Appl. No.: 5,924

[22] Filed: Jan. 19, 1993

Related U.S. Application Data

[63] Continuation of Ser. No. 459,602, Jan. 2, 1990, abandoned.

[51] Int. Cl.[5] .................................................. G06F 9/38
[52] U.S. Cl. .................................. 395/375; 364/231.8; 364/239.4; 364/262.81; 364/DIG. 1; 364/948; 364/948.34; 364/951.5
[58] Field of Search .......................... 395/375, 425, 800

[56] References Cited

U.S. PATENT DOCUMENTS

| | | | |
|---|---|---|---|
| 4,200,927 | 4/1980 | Hughes et al. | 395/375 |
| 4,516,199 | 5/1985 | Frieder et al. | 395/275 |
| 4,714,994 | 12/1987 | Oklobdzija et al. | 395/375 |
| 4,747,045 | 5/1988 | Harigai | 395/375 |
| 4,791,557 | 12/1988 | Angel et al. | 395/375 |
| 4,796,175 | 1/1989 | Matsuo et al. | 395/375 |
| 4,847,759 | 7/1989 | Oklobdzija | 395/425 |
| 4,912,634 | 3/1990 | Nakano et al. | 395/375 |
| 5,113,515 | 5/1992 | Fite et al. | 395/425 |

OTHER PUBLICATIONS

Wharton, "Parallel 486 Pipelines Produce Peak Processor Performance", Microprocessor Report, Jun. 1989, pp. 13-17.

*Primary Examiner*—Thomas C. Lee
*Assistant Examiner*—Paul Harrity
*Attorney, Agent, or Firm*—Charlotte B. Whitaker

[57] ABSTRACT

A sequential prefetch method is provided for a pipelined data processor having a sequential instruction prefetch unit (IPU). An instruction queue in the IPU is coupled to a pipelined instruction unit and an instruction cache of the data processor. A prefetch controller in the IPU keeps the instruction stream prefetched so that the instruction queue may load any combination of one, two, or three word instructions into the pipelined instruction unit every clock cycle. The pipelined instruction unit receives instruction words from the instruction queue, and decodes the instruction for execution operations, and for the instruction length/pipeline movement. A queue filling method is provided for maintaining the requisite number of instruction words in the instruction queue to avoid pipeline stalls. The queue filling method is based upon the movement of the instruction pipeline attributable to the usage by an instruction sequencer of the instruction words received from the instruction queue.

11 Claims, 3 Drawing Sheets

| AAAB BBCC | CDDD EEEF | FFGG GHHH | IIIJ JJKK |
|---|---|---|---|
| LINE n | LINE n+1 | LINE n+2 | LINE n+3 |

*FIG.3A*

| HALF-LINE CACHE ACCESS | QUEUE ZERO | QUEUE ONE | PIPE |
|---|---|---|---|
| AAAB | *A A A B | X X X X | A A A |
| BBCC | A A A B | *B B C C | B B B |
| CDDD | *C D D D | B B C C | C C C |
| — | C D D D | B B C C | D D D |
| EEEF | C D D D | *E E E F | E E E |
| FFGG | *F F G G | E E E F | F F F |
| GHHH | F F G G | *G H H H | G G G |
| — | F F G G | G H H H | H H H |
| IIIJ | *I I I J | G H H H | I I I |
| JJKK | I I I J | *J J K K | J J J |

*FIG.3B*

METHOD FOR REFILLING INSTRUCTION QUEUE BY READING PREDETERMINED NUMBER OF INSTRUCTION WORDS COMPRISING ONE OR MORE INSTRUCTIONS AND DETERMINING THE ACTUAL NUMBER OF INSTRUCTION WORDS USED

This application is a continuation of prior U.S. application Ser. No. 07/459,602 filed Jan. 2, 1990, now abandoned.

FIELD OF THE INVENTION

This invention relates generally to data processors, and more particularly to data processors having instruction pipelines.

BACKGROUND ART

Today's high performance data processors execute a complex set of instructions, wherein each instruction is comprised of a sequence of simple machine operations. Typically, these data processors have instructions of varying length (number of machine operations), and execution time (number of clock cycles per instruction). These variable length instructions are necessary to facilitate memory accesses by numerous instructions operating in a variety of addressing modes.

In the conventional non-pipelined data processor, each instruction executes to completion before the next instruction commences. In order to improve the efficiency of machine operations, while increasing overall performance, pipelined data processors were implemented in conventional data processor designs. These pipelined data processors are capable of executing several instructions concurrently, by overlapping sub-operations of successive instructions. Optimally, pipelined processors fetch one new instruction, and complete executing another instruction every clock cycle. Thus, although the actual execution time required for complex instructions varies, the overall instruction execution rate may approach one instruction per clock cycle. As a result, the use of pipelined processors dramatically improves the overall performance of the data processor.

In order to achieve single cycle instruction execution, an instruction prefetch unit (IPU) must maintain an instruction stream capable of loading the instruction pipeline (IP) with the requisite number of instruction words every clock cycle. If the IPU fails to maintain the required instruction stream, and the IP is not loaded with the requisite number of instruction words, a pipeline stall may occur. In the prior art, some IPUs contain an instruction queue (predetermined number of buffers) for temporarily storing multiple instructions (e.g. four to eight instructions). The instruction queue functions as a dispatcher, and issues a stream of instructions to the IP. During program execution, the buffers in the instruction queue are periodically emptied; therefore, a mechanism for refilling the buffers is necessary. Generally, additional logic is attached to the prefetch instruction queue, to extract the required information from each instruction stored therein, and to refill the instruction queue once it is emptied. Circuit implementation of this additional logic may result in efficient utilization of chip area.

The refilling mechanism must maintain the instruction stream so that any combination of one, two or three-word instructions can be loaded into the IP every clock cycle. Furthermore, the refilling mechanism must accommodate change of flow instructions (e.g. branch), to insure that the instruction queue is filled with the requisite instruction stream.

SUMMARY OF THE INVENTION

Accordingly, it is an object of the present invention to provide an improved data processor prefetch mechanism.

It is another object of the present invention to provide an improved data processor prefetch mechanism which is capable of detecting the earliest point of exhaustion of instructions in a storage device.

It is yet another object of the present invention to provide an improved data processor prefetch mechanism capable of filling an instruction queue based upon the usage of instructions by an instruction sequencer.

These and other objections of the invention are achieved in a data processor having a prefetch controller which prefetches a sequence of instructions of a variable word length from a memory, and provides a predetermined number of instruction words from the sequence of instructions to an instruction queue. The instruction queue is filled based upon the movement of instruction words within an instruction pipeline (PIPE) in response to usage by an instruction sequencer of the predetermined number of instruction words. The instruction sequencer is loaded with the predetermined number of instruction words, in response to a first control signal provided by a queue pointer in the prefetch controller, during a first part of a machine cycle. An instruction resident in the instruction sequencer is decoded to determine the variable word length of the instruction. A second control signal is provided to the prefetch controller, during a second part of the machine cycle, the second control signal indicates the amount of PIPE movement corresponding in value to usage by the instruction sequencer of the predetermined number of instruction words. The queue pointer in the prefetch controller is incremented, by an amount corresponding in value to the amount of PIPE movement in the prefetch controller, to point to a next instruction word in the instruction queue. A next sequence of instructions is retrieved from the memory, for storage in the instruction queue, if any of the following conditions are met. The queue pointer combined with the amount of PIPE movement points to a last instruction word of the predetermined number of instructions stored in a buffer in the instruction queue. The queue pointer combined with the amount of PIPE movement crosses an instruction word boundary of the buffer in the instruction queue.

These and other objects, features and advantages will be more clearly understood from the following detailed description taken in conjunction with the accompanying drawings.

DESCRIPTION OF THE DRAWINGS

FIG. 3A illustrates, in instruction form, the memory contents of four lines of an instruction cache of FIG. 1, for loading an instruction queue.

FIG. 3B is a table illustrating the loading of an instruction queue in the instruction prefetch unit of FIG. 2 in accordance with the present invention.

DETAILED DESCRIPTION OF THE INVENTION

Figure 1:
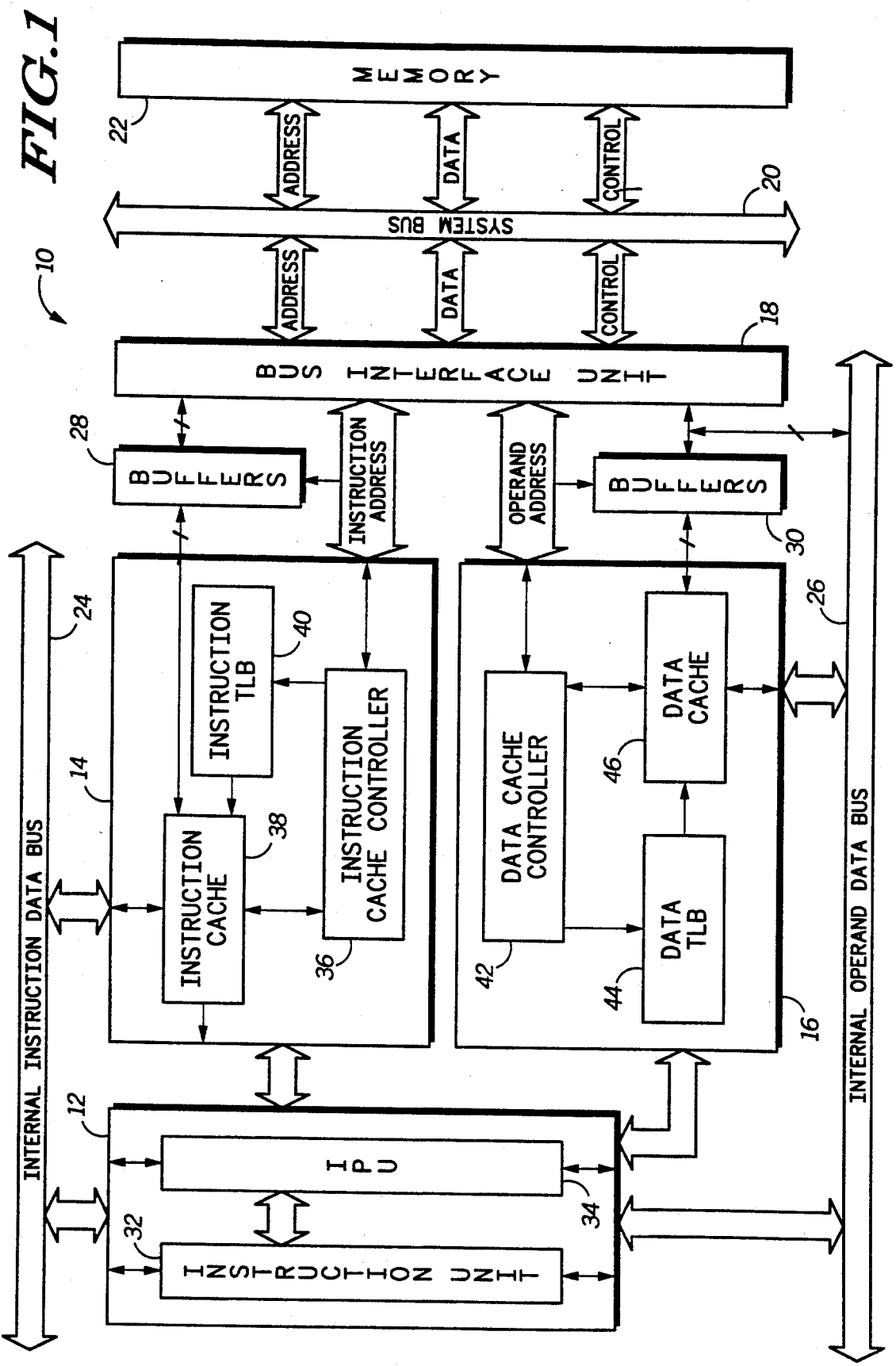
FIG. 1 is a block diagram of a data processing system in accordance with the present invention.

FIG. 1 is a block diagram illustrating the architecture of a data processing system 10, according to a preferred embodiment of the present invention. Data processing system 10 comprises an integer unit 12, an instruction memory unit 14, a data memory unit 16, a bus interface unit (BIU) 18, a system bus 20, a memory 22, an internal instruction data bus 24, an internal word (operand) data bus 26, buffers 28, and 30. In the preferred embodiment of the invention, the integer unit 12 comprises an instruction unit 32 and an instruction prefetch unit (IPU) 34. The instruction memory unit 14 comprises an instruction cache controller 36, an instruction cache 38, and an instruction translation look-aside buffer (ITLB) 40. Similarly, the data memory unit 16 comprises a data cache controller 42, a data translation look-aside buffer (DTLB) 44, and a data cache 46. Instruction cache controller 36 manages the ITLB 40 and instruction cache 38. Likewise, data memory controller 22 manages DTLB 44, and data cache 46. In the preferred embodiment, instruction cache 38 and data cache 46 are 4-way set-associatative caches, with 64 sets of 4, 16-byte lines for a total cache storage capacity of 4 KB each.

Figure 2:
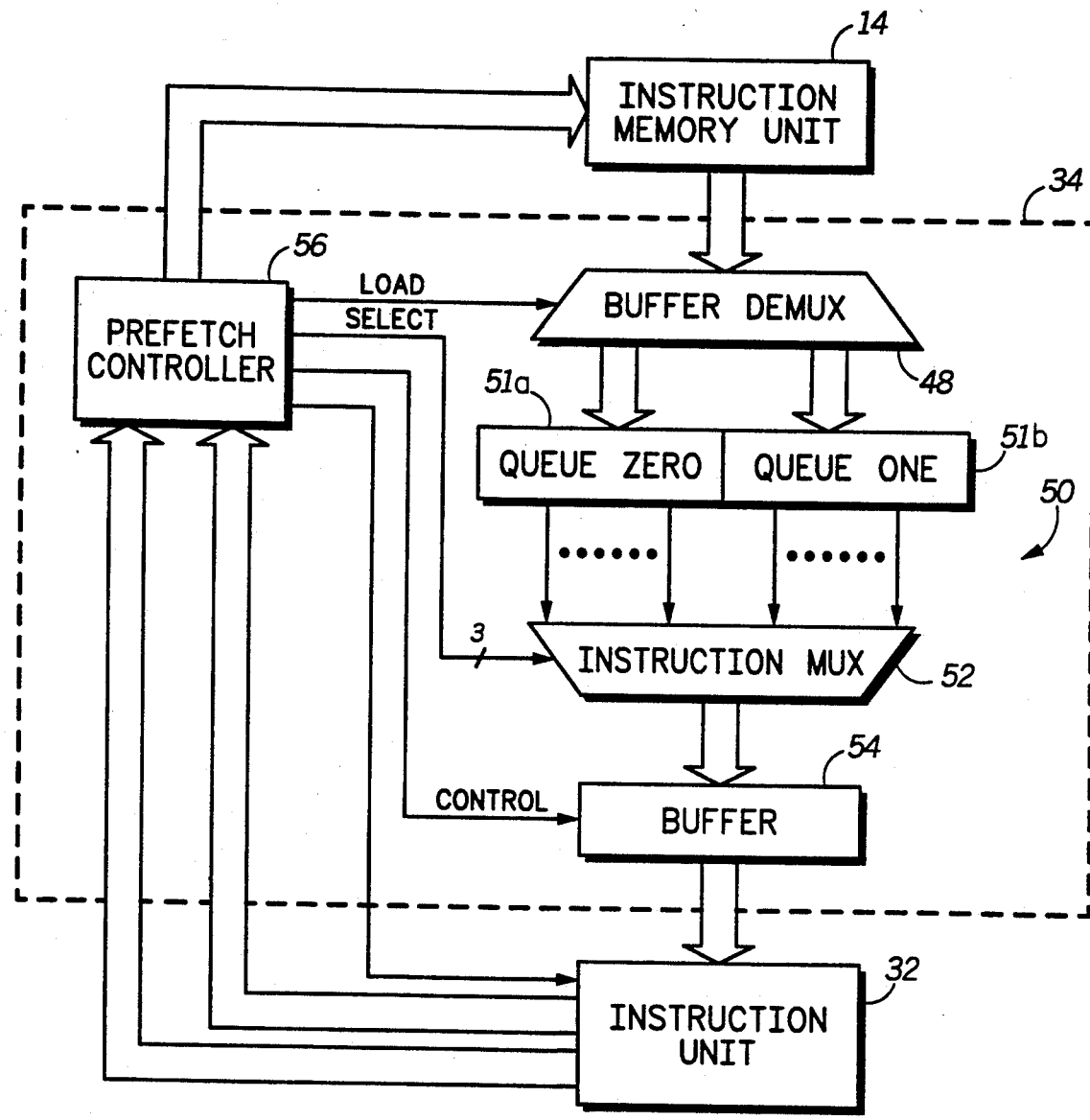
FIG. 2 is a block diagram of an instruction prefetch unit in the data processor of FIG. 1.

Shown in FIG. 2 is a block diagram illustrating the internal architecture of the instruction prefetch unit (IPU) 34 of data processing system 10, according to a preferred embodiment of the present invention. IPU 34 comprises a buffer demultiplexor (BDEMUX) 48, an instruction queue 50, a buffer 54, and a prefetch controller 56. In the present invention, the instruction queue 50 contains 8 instruction words (128 bits), and comprises two 4-word queue buffers QUEUE ZERO, and QUEUE ONE, 51a and 51b, respectively, and an instruction multiplexor (IMUX) 52. Accordingly, QUEUE ZERO 51a and QUEUE ONE 51b are each 64-bits wide, therefore, each stores four (4) instruction words.

In operation, INU 32 receives instructions from the IMUX 52, via the buffer 54. The INU 32 decodes the instructions for instruction word length (instruction pipeline movement), and for execution operations. A program counter (PC) in the prefetch controller 56 points to the current instruction word, and functions as a queue pointer. Upon completion of the instruction decoding, INU 32 transfers the instruction pipeline movement to the prefetch controller 56 which adds the pipe movement to the current PC. Prefetch controller 56 selects a new instruction from IMUX 52, using the lower n bits (e.g. n=3) of the PC. In the present invention, a 1 of 8 queue pointer selects 3 instruction words from the queue in IMUX 52 through a wrapping funnel shifter (shown in FIG. 3), and the 3 instruction words are transferred to the buffer 54. Upon receiving a CONTROL signal from prefetch controller 56, buffer 54 loads the INU 32 with the new instruction, which may be one, two, or three words in length. Once again, INU 32 decodes the instruction for execution operations and for instruction length, and transfers the pipeline movement (0-3 words) to the prefetch controller 56. Prefetch controller 56 advances the PC by the amount of the PIPE movement, and the queue pointer selects a new instruction(s) from the IMUX 52, using the lower 3 bits of the PC.

Once the movement of the instruction pipeline exhausts the instruction words stored in either QUEUE ZERO 51a or QUEUE ONE 51b, prefetch controller 56 initiates an instruction read request from memory, to fill the exhausted queue buffer 51a, or 51b. In the preferred embodiment, prefetch controller 56 issues a READ REQUEST signal to the instruction memory unit 14 for the next series of instruction words. The instruction memory unit 14 determines whether the requested instruction is resident in the instruction cache 38. If the required series of instruction words is resident in the instruction cache 38, a cache "hit" occurs, and instruction memory unit 14 transfers the appropriate halfline (64 bits) from the instruction cache 38 into BDEMUX 48. Prefetch controller 56 transfers a LOAD signal to BDEMUX 48, and thereby alternates the loading of QUEUE ZERO 51a and QUEUE ONE 51b. For example (as shown in FIG. 3B), BDEMUX 48 loads the second half of the cache line n into QUEUE ONE 51b during the current instruction cycle, and loads the first half of cache line n+1 into QUEUE ONE 51b during the next instruction cycle. Thus, writes to the instruction queue 50 are alternated between QUEUE ZERO 51a, and QUEUE ONE 51b, independent of the memory access.

Typically, the instruction cache 38 loads the instruction queue 50 in one instruction cycle. If the required instruction series is not resident in the instruction cache 38, the instruction cache controller 36 determines that a cache "miss" occurred, during the instruction prefetch, and issues a BURST REQUEST signal to the memory 22 (via the BIU 20). In response to the BURST REQUEST signal, the BIU 20 retrieves the entire requested cache line from memory 22, and loads the cache line into the instruction cache 38. The instruction memory unit 14 then transfers the appropriate cache halfline into BDEMUX 48, for transfer into the instruction queue 50.

In the present invention, optimized instructions (e.g. move, shift, and simple arithmetic/logic instructions) have a maximum length of three words. Since the length of a given instruction is unknown, until the INU 32 decodes the instruction, the IMUX 66 loads the INU 32 (via buffer 54) with a three instruction words every clock cycle. Accordingly, the prefetch controller 56 maintains sufficient information in the instruction queue 50 to load INU 32 with a three-word optimized instruction every clock cycle. In order to accomplish this task, the prefetch controller 56 must determine when the data in QUEUE ZERO 51a, or QUEUE ONE 51b is exhausted, and fill the empty queue buffer QUEUE ZERO 51a or QUEUE ONE 51b, accordingly. In the present invention, the method used to load the instruction queue 50 is based on the program counter (queue pointer) and the instruction stream (queue) movement specified by instruction decode or instruction execution. Specifically, the instruction queue 50 is refilled when the current queue pointer plus the instruction pipeline (PIPE) movement (1) is the last word of QUEUE ZERO 51a, or QUEUE ONE 51b, or (2) crosses a 4-word buffer boundary, causing the queue buffer (QUEUE ZERO 51a or QUEUE ONE 51b), accessed by the current pointer, to be exhausted.

FIGS. 3A and 3B illustrate the loading of QUEUE ZERO 51a and QUEUE ONE 51b, over a period of ten (10) instruction cycles, with the contents of the instruction cache 38. During the 10 instruction cycles, INU 32 is loaded every cycle with 3 words from the instruction queue 50, via the IMUX 66. Shown in FIG. 3A, for illustrative purposes only, are the memory contents of cache lines n through n+3 of the instruction cache 38.

Line n, for example, contains the eight (8) instruction words "AAAB BBCC". FIG. 3B illustrates the loading of the instruction queue 50 (QUEUE ZERO 51a and QUEUE ONE 51b) with the contents of the instruction cache 38, and the loading of the pipeline (PIPE) in instruction unit 32. In FIG. 3B, the asterisk indicates which queue buffer, QUEUE ZERO 51a or QUEUE ONE 51b received the cache half-line, during the instruction cycle.

In the present invention, prefetch controller 56 is operable in two modes, a sequential mode, and a change of flow mode. When operating in the sequential mode, prefetch controller 56 alternates the loading of QUEUE ZERO 51a and QUEUE ONE 51b, as previously described. Essentially, in the sequential mode of operation, prefetch controller 56 issues a memory READ REQUEST signal based upon the number of words remaining in the instruction queue 50, after loading the INU 32. In contrast, when operating in the change of flow mode, prefetch controller 56 loads both QUEUE ZERO 51a and QUEUE ONE 51b from the instruction cache 38 (or external memory 22), irrespective of the number of words remaining in the instruction queue 50. Thus, once INU 32 determines that the resident instruction is a change of flow (COF) instruction, INU 32 sends a COF signal to the prefetch controller 56. In response to the COF signal, prefetch controller 56 loads QUEUE ZERO 51a, for example, and loads QUEUE ONE 51b, immediately following the loading of QUEUE ZERO 51a. These prefetches place the instruction queue 50 in the same state as if the target instruction (e.g. branch) was reached through in-line instruction execution.

As shown in FIG. 3B, for illustrative purposes only, prefetch controller 56 issued a READ REQUEST signal to the instruction memory unit 14, thereby causing the instruction memory unit 14 to load QUEUE ZERO 51a, and QUEUE ONE 51b with the contents of cache line n. Accordingly, in response to the READ REQUEST signal, the instruction memory unit 14 loaded QUEUE ZERO 51a with instruction words "AAAB", and QUEUE ONE 51b with words "BBCC", as indicated by the asterisk. During the first half of the first instruction cycle, INU 32 decodes the current instruction resident in the PIPE (the current instruction is not shown in FIG. 3B), and transfers the PIPE movement of 0-3 words to the prefetch controller 56. INU 32 then proceeds with instruction execution, in a conventional manner. During the second half of the first instruction cycle, the prefetch controller 56 advances the PC, based upon the indicated PIPE movement, and selects the next word set from the IMUX 66. Accordingly, the queue pointer selects three words from IMUX 66 ("AAA"), which are loaded into the INU 32 (PIPE).

During the first half of the second instruction cycle, INU 32 decodes the "AAA" instruction, and responds back to the prefetch controller 56, indicating that the instruction word length is three (3). Prefetch controller 56 determines that after incrementing the current queue pointer by the PIPE movement there is only one (1) word remaining in QUEUE ZERO 51a (after the PIPE load). As a result of this determination, the prefetch controller 56 initiates a READ REQUEST signal to the instruction memory unit 14 to load the first half of the cache line n+1 ("CDDD") into QUEUE ZERO 51a, during the first half of the second instruction cycle (as indicated by the arrow). As described above, prefetch controller 56 alternates the loading QUEUE ZERO 51a, and QUEUE ONE 51b, independent of the instruction cache 38 access. During the second half of the second instruction cycle, prefetch controller 56 increments the PC by three (3), and selects another word set from the instruction queue 50. Accordingly, queue pointer selects three words from IMUX 66 ("BBB"), which are loaded into the PIPE, during the second half of the second instruction cycle.

During the first half of the third instruction cycle, INU 32 decodes the "BBB" instruction, and once again responds back to the prefetch controller 56, as described above. During the second half of the third instruction cycle, prefetch decoder 56 advances the PC accordingly, and selects the next instruction word set ("CCC") from IMUX 66, which is loaded into the PIPE. During the first half of the fourth instruction cycle, INU 32 decodes the "CCC" instruction, and responds back to the prefetch controller 56 that the instruction word length is three (3). Prefetch controller 56 ascertains that the PIPE movement crosses the 4-word buffer boundary, thereby exhausting the data stored in QUEUE ONE 51b. As a result, prefetch controller 56 issues a READ REQUEST signal to the instruction memory unit 14 to load the second half of cache line n+1 ("EEEF") into QUEUE ONE 51b, during the next cycle (first half of the fifth instruction cycle), as indicated by the arrow. During the second half of the fourth instruction cycle, prefetch decoder 56 advances the PC accordingly, and selects the next word set ("DDD") from IMUX 66, which is loaded into the PIPE. This sequential prefetch method continues until the INU 32 detects a change of flow instruction.

In the present invention, prefetch controller 56 may initiate two or three 4-word prefetches in response to a change of flow instruction (e.g. branch instruction). As described earlier, INU 32 decodes each instruction for instruction length/pipe movement, and for execution operations. Upon detecting a change of flow instruction, the INU 32 will transfer a change of flow (COF) signal and the instruction address to prefetch controller 56. In response to the COF signal, prefetch controller 56 initiates the requisite number of instruction prefetches cycles (two or three 4-word prefetches), as part of the instruction.

In the present invention, the INU 32 responds to the prefetch controller 56 with the amount of PIPE movement (e.g. 0-3 words) during the first half of the clock cycle. The prefetch controller 56 uses the second half of the clock cycle to advance the program counter (queue pointer) and select another word set from the instruction queue 50. The instruction queue 50 filling method is based on the program counter, and the instruction stream movement specified by the INU 32 after the instruction decode or instruction execution. A model illustrating the queue filling method is illustrated below.

| | |
|---|---|
| In the model: | |
| Q0/Q1 | denotes the instruction queue buffers QUEUE ZERO 51a, and QUEUE ONE 51b. |
| MOVE | is the number of words the instruction PIPE is to be advanced. |
| PC | program counter is the current pointer to the instruction stream. |
| read__req | is the control signal to initiate an instruction to fill an emptied buffer |
| CASE 1: | |
| queue pointer} | Q0/Q1<br>0/4:   begin |

```
                            -continued
                        case  MOVE
queue pointer  0: read_req= 0
movement}
              } 1:read_req= 0
              } 2:read_req= 0
              } 3:read_req= 1    PC+MOVE=Last Word
              endcase
        end
CASE 2:
                 Q0/Q1
queue pointer}   1/5:       begin
                        case  MOVE
queue pointer  0:read_req= 0
movement}
              } 1:read_req= 0
              } 2:read_req= 1    PC+MOVE=Last Word
              } 3:read_req= 1    PC=MOVE=Cross 4-Word
              endcase                   Boundary
        end
CASE 3:
                 Q0/Q1
queue pointer}   2/6:       begin
                        case  MOVE
queue pointer  0:read_req= 0
movement}
              } 1:read_req= 1    PC+MOVE=Last Word
              } 2:read_req= 1}   PC+MOVE=Cross 4-Word
              } 3:read_req= 1}           Boundary
              endcase
        end
CASE 4:
                 Q0/Q1
queue pointer:   3/7:       begin
                        case  MOVE
queue pointer  0:read_req= 0
movement}
              } 1:read_req= 0
              } 2:read_req= 0
              } 3:read_req= 0
              endcase
```

Accordingly, in the present invention, the queue filling method is based on the number of words left in the instruction queue 50, after the three (3) word optimized instruction is loaded into the INU 32 (PIPE), and before the instruction queue 50 is loaded from the instruction cache 38. As illustrated in CASE 1 and 2 above, if three or more words remain in the instruction queue 50, after the PIPE load, then the prefetch controller 56 will not issue a READ REQUEST to the instruction memory unit 14. Similarly, as illustrated in all cases, if the PIPE movement is zero, the prefetch controller 56 will not issue a READ REQUEST signal, and thus, no instruction prefetch occurs. When the queue pointer (PC) plus the PIPE movement (MOVE) crosses a 4-word buffer boundary, the required instruction word is prefetched during the next instruction cycle (CASE 3, and 4). In CASE 4, the queue pointer initially points to the last word in the instruction queue buffers QUEUE ZERO 51a, and QUEUE ONE 51b. Consequently, prefetch controller 56 does not initiate a READ REQUEST signal, regardless of the amount of PIPE movement, since the required half-line from the instruction cache 38 was already retrieved (see FIG. 3B).

While the present invention has been described in a preferred embodiment, it will be apparent to those skilled in the art that the disclosed invention may be modified in numerous ways and may assume many embodiments other than that specifically set out and described above. For example, the queue filling method may be modified to insure that greater than a three-word optimized instruction is loaded into the instruction PIPE every clock cycle. Essentially, increasing the size of the instruction queue 50 to accommodate sixteen (16) instruction words (256 bits), for example, facilitates full cache line accesses from the PIPE. Furthermore, the IMUX 66 would be modified so that word sets larger than three words were loaded into the instruction PIPE every clock cycle. Likewise, IPU 34 may dispatch multiple instructions of a single word length to INU 32. Thus, the IPU 34 is capable of providing variable length instructions or a variable number of instructions to the INU 32 each clock cycle, and filling the instruction queue 50 based upon the usage of instructions by the INU 32. Accordingly, it is intended by the appended claims to cover all modifications of the invention which fall within the true spirit and scope of the invention.

We claim:

1. In a data processor having a prefetch controller for prefetching a sequence of instructions from a memory, where each instruction in said sequence of instructions is comprised of a variable number of instruction words, said prefetch controller being coupled to said memory for loading a predetermined number of instruction words from said sequence of instructions into an instruction queue, said instruction queue having a predetermined number of buffers, each buffer having a predetermined n-word instruction boundary for storing a set of n instruction words retrieved from said memory, where n is an integer, a method for filling said instruction queue based upon movement of said predetermined number of instruction words within a pipelined instruction unit, said method comprising the steps of:

loading said pipelined instruction unit, with a first set of instruction words comprising one or more instructions from a first sequence of instructions, said first set of instruction words being selected from said instruction queue, in response to a first control signal provided to said instruction queue by a queue pointer in said prefetch controller, during a first part of a machine cycle;

decoding, via said pipelined instruction unit, said first set of instruction words to determine a word length of a first instruction in said first set of instruction words, said word length corresponding in value to an amount of movement of said pipelined instruction unit occurring as a result of loading said first set of instruction words;

providing, via said pipelined instruction unit, a second control signal to said prefetch controller, during a second part of said machine cycle, said second control signal indicating said word length of said first instruction;

incrementing a current value of said queue pointer by an amount corresponding in value to said amount of movement of said pipelined instruction unit, in response to said prefetch controller receiving said second control signal, said queue pointer thereafter pointing to a second set of instruction words comprising one or more instructions stored in said instruction queue, to be subsequently loaded into said pipelined instruction unit; and retrieving a next sequence of instructions from said memory to refill said instruction queue, if any one of the following conditions are met:

the current value of the queue pointer combined with the amount of movement of said pipelined instruction unit occurring as the result of loading said first set of instruction words points to a last instruction word in one of said predetermined number of buffers, in said instruction queue; or the current value of the queue pointer combined with the amount of movement of said pipelined instruction unit occurring as the result of loading said first set of instruction words crosses said n-word instruction boundary of one of said predetermined number of buffers in said instruction queue.

2. The queue filling method according to claim 1 further comprising the step of transferring said second set of instruction words in said instruction queue to said pipelined instruction unit, after incrementing said current value of queue pointer in said prefetch controller.

3. The queue filling method according to claim 2 further comprising the step of providing, via said pipelined instruction unit, a third control signal to said prefetch controller, after decoding said first set of instruction words, said third control being provided to said prefetch controller if said first instruction in said first set of instructions words is a change of flow instruction, said prefetch controller initiating a required number of instruction prefetch cycles, in response thereto, as part of said change of flow instruction.

4. In a data processor having a prefetch controller for prefetching a plurality of instruction words from a memory, for storage in an instruction queue, said instruction queue having a predetermined number of buffers, each buffer having a predetermined n-word instruction boundary for storing a set of n instruction words retrieved from said memory, where n is an integer, and for providing a predetermined number of instruction words comprising one or more instructions from said instruction queue to a pipelined instruction unit, a method for filling the instruction queue, based upon an amount of movement of said pipelined instruction unit occurring as a result of loading said predetermined number of instruction words, the method comprising the steps of:

decoding, via said pipelined instruction unit, a first sequence of said predetermined number of instruction words resident in said pipelined instruction unit to determine the amount of movement of said pipelined instruction unit, said amount of movement corresponding in value to a number of said first sequence of instruction words used by said pipelined instruction unit during a first part of a machine cycle;

incrementing a current value of a queue pointer in said prefetch controller, by an amount corresponding in value to the amount of movement of said pipelined instruction unit, in response to said prefetch controller receiving a first control signal from said pipelined instruction unit during a second part of said machine cycle, said first control signal indicating the amount of movement of said pipelined instruction unit; and retrieving a next sequence of instruction words from said memory to refill said instruction queue, if any one of the following conditions are met:

the current value of the queue pointer combined with the amount of movement of said pipelined instruction unit occurring as the result of loading said first sequence of instruction words points to a last instruction word in one of said predetermined number of buffers in said instruction queue; or the current value of the queue pointer combined with the amount of movement of said pipelined instruction unit occurring as the result of loading said first sequence of instruction words crosses the n-word instruction boundary of one of said predetermined number of buffers in said instruction queue.

5. The method for filling an instruction queue according to claim 4 further comprising the step of providing, via said pipelined instruction unit, a second control signal to said prefetch controller, after decoding said first sequence instructions words resident in said pipelined instruction unit, said second control signal being provided to said prefetch controller if a first instruction in said first sequence of instructions words is a change of flow instruction, said prefetch controller initiating a required number of instruction prefetch cycles, in response thereto, as part of said change of flow instruction.

6. In a data processor having a prefetch controller for prefetching a sequence of instructions of a variable word length from a memory, and for providing a predetermined number of instructions instruction words comprising one or more instructions from said sequence of instructions to an instruction queue, said instruction queue having a predetermined number of buffers having an n-word instruction boundary for storing a set of n instruction words retrieved from memory, where n is an integer, a method for filling said instruction queue based upon an amount of movement of instructions within a pipelined instruction unit in response to usage by said pipelined instruction unit of said predetermined number of instruction words, the method comprising the steps of:

decoding said predetermined number of instruction words resident in said pipelined instruction unit, during a first part of a machine cycle, to determine the following:

the word length of a current instruction; and the movement of said pipelined instruction unit occurring as a result of execution by said pipelined instruction unit of said current instruction resident in said pipelined instruction unit;

providing, via said pipelined instruction unit, a first control signal to said prefetch controller indicating the amount of movement of said pipelined instruction unit occurring as the result of executing said current instruction, said amount of movement corresponding in value to the word length of said current instruction resident in said pipelined instruction unit;

advancing a current value of a queue pointer in said prefetch controller to point to a next predetermined number of instruction words from said instruction queue, based upon the amount of movement of said pipelined instruction unit corresponding in value to the word length of said current instruction resident in said pipelined instruction unit, during a second part of said machine cycle; and retrieving a next sequence of instructions from said memory to refill said instruction queue if any one of the following conditions are met:

the current value of the queue pointer combined with the amount of movement of said pipelined instruction unit occurring as the result of executing said current instruction points to a last instruction word in one of said predetermined number of buffers in said instruction queue; or the current value of the queue pointer combined with the amount of movement of said pipelined instruction unit occurring as the result of executing said current instruction crosses said n-word instruction boundary of one of said predetermined number of buffers in said instruction queue.

7. The queue filling method according to claim 6 further comprising the step of loading said next predetermined number of instruction from said instruction queue into said pipelined instruction unit, after advancing said current value of the queue pointer in said prefetch controller.

8. The queue filling method according to claim 6 further comprising the step of providing, via said pipelined instruction unit, a second control signal to said prefetch controller, after decoding said current instruction resident in said pipelined instruction unit, said second control signal being provided to said prefetch controller if said current instruction is a change of flow instruction, said prefetch controller initiating a required number of instruction prefetch cycles, in response thereto, as part of said change of flow instruction.

9. In a data processor having a prefetch controller for prefetching a plurality of instruction words from a memory, for storage in an instruction queue, said instruction queue having a predetermined number of buffers, each buffer having a predetermined n-word instruction boundary for storing a set of n instruction words retrieved from said memory, where n is an integer, and for providing a predetermined number of instruction words comprising one or more instructions from said instruction queue to a pipelined instruction unit, a method for filling the instruction queue, based upon an amount of movement of said pipelined instruction unit occurring as a result of loading said predetermined number of instruction words, the method comprising the steps of:

decoding, via said pipelined instruction unit, a first set of said predetermined number of instruction words resident in said pipelined instruction unit to determine the amount of movement of said pipelined instruction unit, said amount of movement corresponding in value to a number of words in a first instruction used by said pipelined instruction unit during a first part of a machine cycle;

incrementing a current value of a queue pointer in said prefetch controller, by an amount corresponding in value to the amount of movement of said pipelined instruction unit, in response to said prefetch controller receiving a first control signal from said pipelined instruction unit during a second part of said machine cycle, said first control signal indicating the amount of movement of said pipelined instruction unit;

selecting, from said instruction queue, a next set of said predetermined number of instruction words for loading into said pipelined instruction unit, during a subsequent clock cycle, based upon said incremented value of said queue pointer; and re-filling said instruction queue with a sequence of instruction words retrieved from said memory, if any one of the following conditions are met:

the incremented value of the queue pointer points to a last instruction word in one of said predetermined number of buffers in said instruction queue; or the incremented value of the queue pointer crosses the n-word instruction boundary of one of said predetermined number of buffers in said instruction queue.

10. The method for filling an instruction queue according to claim 9 further comprising the step of loading said pipelined instruction unit with said first set of said predetermined number of instruction words selected from said instruction queue, in response to said first control signal provided to said instruction queue by a queue pointer in said prefetch controller, during said first part of a machine cycle.

11. The method for filling an instruction queue according to claim 10 further comprising the step of providing, via said pipelined instruction unit, a second control signal to said prefetch controller, after decoding said first set of said predetermined number of instructions words resident in said pipelined instruction unit, said second control signal being provided to said prefetch controller if said first instruction is for a change of flow instruction, said prefetch controller initiating a required number of instruction prefetch cycles, in response thereto, as part of said change of flow instruction.

* * * * *

UNITED STATES PATENT AND TRADEMARK OFFICE
CERTIFICATE OF CORRECTION

PATENT NO. : 5,317,701

DATED : May 31, 1994

INVENTOR(S) : Russell Reininger, et al.

It is certified that error appears in the above-identified patent and that said Letters Patent is hereby corrected as shown below:

Column 10, line 22, after "of" delete [instructions]

Signed and Sealed this

Twentieth Day of December, 1994

*Attest:*

BRUCE LEHMAN

*Attesting Officer*     Commissioner of Patents and Trademarks